(No Model.)
I. N. PLOTTS.
SPOON.
No. 431,914. Patented July 8, 1890.
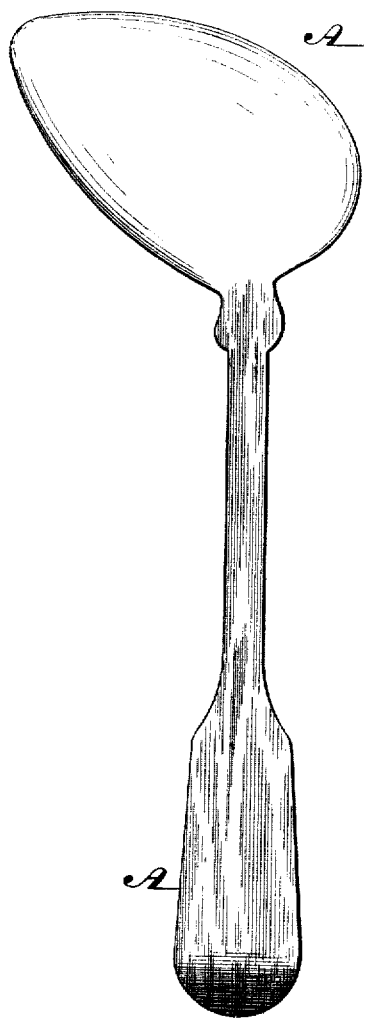
WITNESSES:
INVENTOR:

UNITED STATES PATENT OFFICE.

ISAAC N. PLOTTS, OF PHILADELPHIA, PENNSYLVANIA.

SPOON.

SPECIFICATION forming part of Letters Patent No. 431,914, dated July 8, 1890.

Application filed December 20, 1887. Serial No. 258,477. (No model.)

*To all whom it may concern:*

Be it known that I, ISAAC N. PLOTTS, a citizen of the United States, residing in the city and county of Philadelphia, State of Pennsylvania, have invented a new and useful Improvement in Spoons, which improvement is fully set forth in the following specification and accompanying drawing.

My invention relates to improvements in tea, table, dessert, and similar spoons; and it consists in the constructing of the same with a handle projecting from the bowl in such manner that a line drawn from the inner end of the handle across the bowl in the direction of the line of the handle divides the bowl so that it is substantially balanced, the line of the length of the bowl being at an angle to the line of the handle.

The figure in the drawing represents a spoon embodying the features of my invention.

Referring to the drawing, A represents a table-spoon, which may, however, be of the order of dessert, tea, or other spoon. The bowl is attached to the handle in an oblique direction; or, in other words, said bowl departs from the customary right-line direction of the handle and extends at an obtuse angle thereto. The handle extends outwardly from the bowl in such manner that a line passing from the inner end and in the same direction as an inner extension of the handle would divide the said bowl, so that portions thereof would be on opposite sides of the line, by which provision the bowl is balanced. By this provision the bowl may be readily filled from a plate, cup, &c., and conveyed to the mouth in a most convenient manner, as it avoids excessive bending of the arm and places the point of the bowl in the most convenient position for reaching the mouth, and when the spoon is upturned the bowl is cleared in the direction of the long axis thereof, the clearing or discharging of the spoon thus being effected in a convenient manner and comparatively noiseless, owing to the smallest part of the spoon being presented to and entering the mouth.

I am aware that it is not new to construct a spoon with a handle at an angle to the bowl, and therefore disclaim the same.

Having thus described my invention, what I claim as new, and desire to secure by Letters Patent, is—

As a new article of manufacture, a tea, table, or other spoon having the line of the length of its handle at an angle to the line of the length of the bowl and the handle so secured to the side of the bowl that a line drawn in the direction of the handle from the inner end thereof so divides the bowl as to balance the same, said parts being combined substantially as described.

I. N. PLOTTS.

Witnesses:
JOHN A. WIEDERSHEIM,
JAMES F. KELLY.